United States Patent [19]

Chandonnet et al.

[11] Patent Number: 4,875,654
[45] Date of Patent: Oct. 24, 1989

[54] MAGNETIC PICTURE RETAINER

[75] Inventors: Michel Chandonnet; Luc Chandonnet, both of Ste Foy, Canada

[73] Assignee: Yvon Chandoneet, Terrebonne, Canada

[21] Appl. No.: 139,011

[22] Filed: Dec. 29, 1987

[51] Int. Cl.⁴ .............................................. A47F 7/14
[52] U.S. Cl. .................................. 248/467; 248/206.5
[58] Field of Search ................... 248/467, 206.5, 544, 248/497; 40/152.1

[56] References Cited

U.S. PATENT DOCUMENTS

| 2,521,885 | 9/1950 | Vasquez. | |
|---|---|---|---|
| 2,643,849 | 6/1953 | Lanman. | |
| 2,742,250 | 4/1956 | Gronberger. | |
| 2,953,970 | 9/1960 | Maynard | 248/206.5 X |
| 3,031,799 | 5/1962 | Bradsby. | |
| 3,109,619 | 11/1963 | Krug. | |
| 3,160,280 | 12/1964 | Burch | 248/544 X |
| 3,245,165 | 4/1966 | Podoloff. | |
| 3,361,404 | 1/1968 | Lohr. | |
| 3,604,673 | 9/1971 | Klein. | |
| 4,211,382 | 7/1980 | Bonfils. | |
| 4,427,960 | 1/1984 | Wuerfel. | |
| 4,678,150 | 7/1987 | Newman et al. | 248/467 X |

FOREIGN PATENT DOCUMENTS

| 1152908 | 8/1963 | Fed. Rep. of Germany | 248/467 |
| 1516174 | 1/1968 | France. | |
| 326227 | 1/1958 | Switzerland | 248/467 |

Primary Examiner—Alvin C. Chin-Shue
Assistant Examiner—David L. Talbott
Attorney, Agent, or Firm—Jones, Day, Reavis & Pogue

[57] ABSTRACT

The present invention relates to an attaching device for mounting a picture on a wall or on a similar supporting structure. The attaching device comprises a pair of magnetically attracting members, one of the members being mounted on the wall and the other of the members being mounted on the back of the picture. One of the members comprises a projecting pin adapted to fit into a seat formed on the other member for preventing the members from sliding relative to each other when they are in engagment.

4 Claims, 1 Drawing Sheet

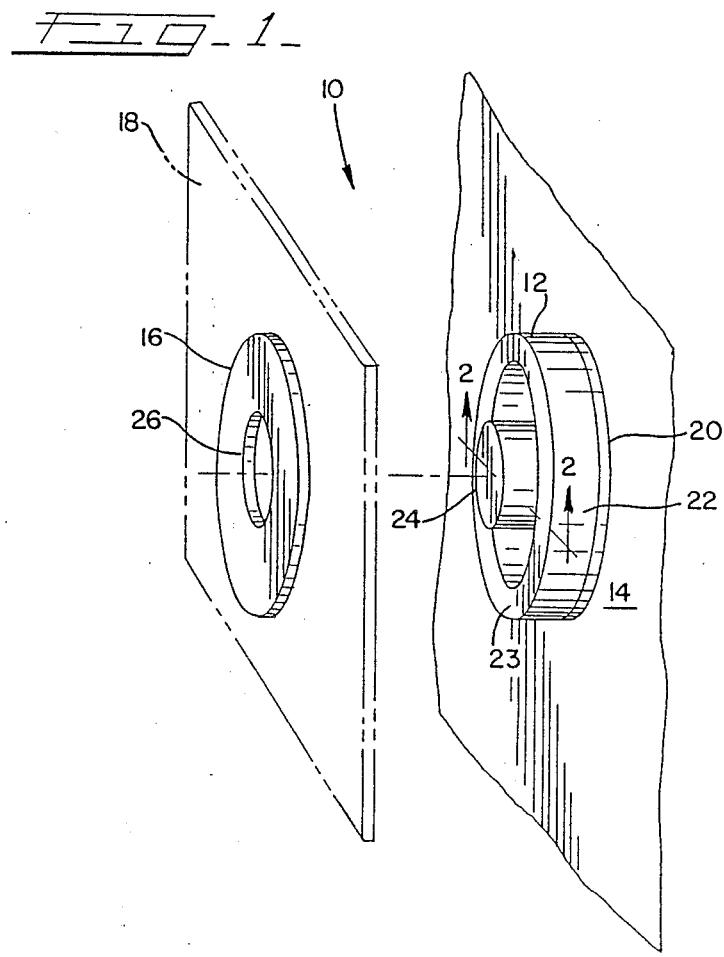
FIG_1_
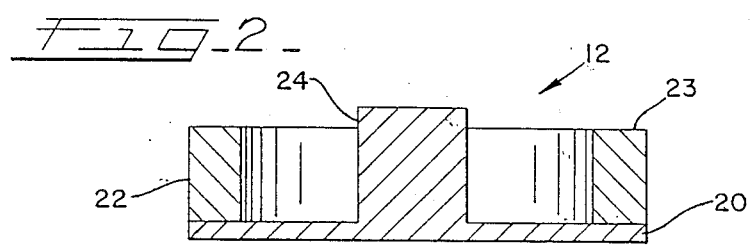
FIG_2_
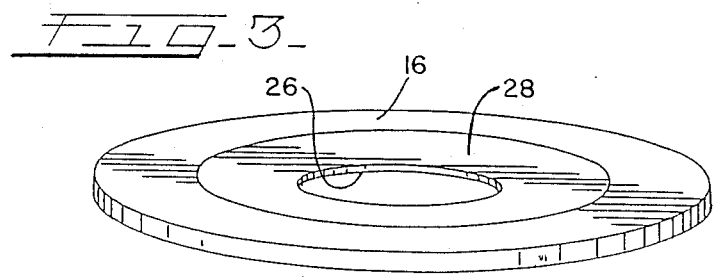
FIG_3_

MAGNETIC PICTURE RETAINER

FIELD OF THE INVENTION

The present invention relates to the general field of fasteners, and more particularly to a magnetic attaching device for mounting a picture on a wall or on a similar supporting structure.

BACKGROUND OF THE INVENTION

A picture is normally hung from a wall by attaching a hook to the wall, which engages a wire bail provided on the back of the picture (herein the term "picture" includes a mirror, a painting and all other object that is adapted to be hung from a wall or from a similar supporting structure in a way a picture is normally hung such as by a wire bail, a hook or the like).

This method of attachment has not been entirely satisfactory mainly because the bottom edge of the picture, which normally contacts the wall, can scratch or stain the wall paint especially if the picture remains hung at the same place for long time periods. Thus, when it is desired to relocate or remove the picture, the wall must be repainted to mask the scratched and stained areas.

Various devices have been proposed in the past to overcome this drawback. However, none of these so called improvements have found wide acceptance among the public because they are complex to use and to manufacture.

Therefore, an object of the invention is an improved picture attaching device.

The object of the invention is achieved by providing an attaching device comprising a pair of magnetically attracting and cooperating members, one of the members being adapted to be mounted on the back of a picture and the other member being adapted to be mounted to a wall on which the picture is to be installed.

One of the retaining members is provided with a projection adapted to be received into a seat provided on the other member when the retaining members are in engagement. The projection prevents an undesirable sliding movement between the retaining members under the influence of gravity, which otherwise may occur when a heavy picture is to be mounted on the wall.

In a preferred embodiment, the projection and the seat for receiving the projection have circular configurations to enable the retaining members to rotate one respective to the other while being in engagement. This feature permits easy changing of the orientation of the picture on the wall without separating the retaining members, which is desirable for abstract art paintings that may be installed in various positions since they depict no recognizable things.

Therefore, the present invention comprises in a general aspect, a device for mounting a picture on a supporting structure, the device comprising first and second magnetically attracting members, the first member being adapted to be mounted to the supporting structure and the second member being adapted to be mounted to the picture, one of the members having a projection and the other of the members having a seat adapted to receive the projection when the members are in engagement for preventing the members from sliding relative to each other.

BRIEF DESCRIPTION OF THE DRAWINGS

FIG. 1 is a perspective view of a magnetic picture attaching device, according to the invention;

FIG. 2 is a cross-sectional view taken along lines 2—2 of FIG. 1; and

FIG. 3 is an enlarged perspective view of a variant of one of the retaining members.

DESCRIPTION OF A PREFERRED EMBODIMENT

Turning now to the annexed drawings, the picture attaching device, according to the invention, generally identified by the reference numeral 10, comprises a pair of cooperating magnetic members, namely a first member 12, adapted to be mounted to a wall 14, and a second member 16 for mounting to the back of a picture shown in phantom lines at 18.

The first and second members are mounted to the wall 14 and the back of the picture 18, respectively by quick setting epoxy adhesive, well known to those skilled in the art. The use of epoxy adhesive is advantegeous because it cures rapidly and provides a durable bond, however, other methods of attachment may be envisaged without departing from the spirit of the invention.

In FIG. 1, the size of the attaching device 10 has been highly exaggerated with respect to the size of the picture 18 for the purpose of better illustrating the invention. It is to be understood, that normally attaching device 10 is much smaller than the picture, typically having a diameter in the range of three to four centimeters, for a picture of an average size. However, these dimensions are not to be considered in a limitative manner because they may be varied to suit various applications.

The first retaining member 12 has a generally circular configuration comprising a circular back-plate 20 on which is adhesively mounted an annular permanent magnet 22. From the back-plate 20 projects centrally located pin 24 extending slightly beyond the top surface of the magnet 22, as best shown in FIG. 2.

The second retaining member 16 has an annular shape with an outer diameter corresponding generally to the outer diameter of the permanent magnet 22, and further comprises a central circular opening 26 adapted to receive the pin 24. The second retaining member 16 is made of material having high magnetic permeability such as iron, for being attracted and retained on the permanent magnet 22.

The thickness of the second retaining member 16 corresponds approximately to the distance from the top surface of the permanent magnet 22 to the top of the cylindrical pin 24, of the first retaining member 12.

The picture attaching device 10 may be made commercially available as a kit containing both retaining members 12 and 16 and a quantity of quick setting epoxy adhesive in a small tube. To effect the connection of the picture 18 to the wall 14, epoxy adhesive is applied to the back-plate 20 and the first retaining member 12 is pressed at the desired location on the wall 14 and it is maintained in this position until the adhesive is set. Then, the same procedure is repeated to mount the second retaining member 16 on the back of the picture 18. When the epoxy adhesive is fully cured, the picture 18 is brought against the wall 14 to seat the second retaining member 16 on the permanent magnet 22, the central pin 24 fitting in the opening 26. When the installation is completed, the picture 18 remains at a distance from the wall 14, thus, preventing any damage to the finish of the wall.

Since the difference in height between the top of the cylindrical pin 24 and the top surface of the permanent magnet 22 corresponds generally to the thickness of the second retaining member 16, when both members are in engagement, the surface of the second retaining member 16 in contact with the back of the picture 18 is flush with the top surface of the cylindrical pin 24, thus allowing to firmly seat the second retaining member 16 on the permanent magnet 22.

The meeting faces of the retaining members 12 and 16 being in a generally vertical plane, the central pin 24 prevents the retaining member 16 from sliding on the permanent magnet 22 under the influence of the gravity when the attaching device is used for mounting a heavy picture on the wall. It could be envisaged to omit the central pin 24, however, in such case the magnetic annular element 22 must be made large to provide a magnetic attraction sufficient to prevent the retaining member 16 from sliding downwardly. Such solution, however, is less advantageous because it reduced the compactness of the attaching device 10 as well as increasing the manufacturing costs.

Due to the circular configuration of the pin 24 and of the opening 26, the retaining member 16 may rotate on the retaining member 12 while the retaining members are in engagement. This feature is interesting since it permits turning the picture 18 on the wall 18, either for straightening same when the picture 18 becomes misaligned, or for changing the position of the picture 18 on the wall, which is desirable for abstract art paintings that depict no recognizable things and may be installed in various positions.

From the above description, it becomes obvious to those skilled in the art that various modifications and refinements may be made to the attaching device without departing from the spirit of the invention.

For example, it may be envisaged to mount the retaining member 12, carrying the magnetic element 22 on the back of the picture 18 and, accordingly, install the retaining member 16 on the wall 14.

If it is desired to provide a stronger retaining force between the retaining members 12 and 16, both members may be made of permanent magnetic material, provided they have opposite polarities. However, this modification is less attractive because it increases the manufacturing costs of the attaching device.

FIG. 3 illustrates a variant of the second retaining member 16. The surface of the second retaining member 16 which faces the permanent magnet 22 is provided with a depression 28 extending toward the opening 26. The depression 28 acts as a locating means to facilitate the engagement of the retaining members, guiding the pin 24 toward the opening 26.

Although the invention has been described above with respect to one specific form, it will be evident to persons skilled in the art that it may be refined and modified in various ways. It is therefore wished to have it understood that the present invention should not be limited in interpretation except by the terms of the following claims.

We claim:

1. A device for mounting a picture on a supporting structure, said device comprising: first and second magnetically attracting members, said first member being adapted to be mounted to said supporting structure and said second member being adapted to be mounted to said picture, wherein said first member includes:
   a back-plate adapted to be mounted to said supporting structure;
   a permanent magnet having an annular shape;
   a centrally located pin extending slightly beyond the frontal face of said permanent magnet; and
   said second member having a seat adapted to receive said pin when said members are engaged for preventing said members from sliding relative to each other.

2. A device for mounting a picture on a supporting structure, said device comprising: first and second magnetically attracting members, said first member being adapted to be mounted to said supporting structure and said second member being adapted to be mounted to said picture, wherein said first member includes:
   a back-plate adapted to be mounted to said supporting structure;
   a permanent magnet having an annular shape;
   a centrally located pin extending slightly beyond the frontal face of said permanent magnet; and
   said second member having a centrally located opening adapted to receive said pin when said members are engaged for preventing said members from sliding relative to each other.

3. A device for mounting a picture on a supporting structure, said device comprising: first and second magnetically attracting members, said first member being adapted to be mounted to said supporting structure and said second member being adapted to be mounted to said picture, wherein said first member includes:
   a back-plate adapted to be mounted to said supporting structure;
   a permanent magnet having an annular shape;
   a centrally located pin extending slightly beyond the frontal fact of said permanent magnet a distance corresponding to the thickness of said second member; and
   said second member having a centrally located opening adapted to receive said pin when said members are engaged for preventing said members from sliding relative to each other.

4. A device for mounting a picture on a supporting structure, said device comprising: first and second magnetically attracting members, said first member being adapted to be mounted to said supporting structure and said second member being adapted to be mounted to aid picture, wherein said first member includes:
   a back-plate adapted to be mounted to said supporting structure;
   a permanent magnet having an annular shape;
   a centrally located pin extending slightly beyond the frontal face of said permanent magnet; and
   said second member having a centrally located opening adapted to receive said pin when said members are engaged for preventing said members from sliding relative to each other, wherein said second member includes a locating means in the form of a depression centered on said opening for guiding said pin toward said opening during engagement of said members.

* * * * *